United States Patent [19]

Nishihama et al.

[11] Patent Number: 4,560,631
[45] Date of Patent: Dec. 24, 1985

[54] ORGANIC ELECTROLYTE CELLS

[75] Inventors: Hideki Nishihama; Kazuhide Miyazaki, both of Takehara, Japan

[73] Assignee: Mitsui Mining & Smelting Co., Ltd., Nibhombashi, Japan

[21] Appl. No.: 657,142

[22] Filed: Oct. 3, 1984

[30] Foreign Application Priority Data

Dec. 19, 1983 [JP] Japan .................. 58-238015

[51] Int. Cl.⁴ ............................................. H01M 6/14
[52] U.S. Cl. ..................................... 429/194; 429/224
[58] Field of Search ...................... 429/194, 197, 224

[56] References Cited

U.S. PATENT DOCUMENTS

| | | | |
|---|---|---|---|
| 4,139,680 | 2/1979 | Schlaijker | 429/196 X |
| 4,167,608 | 9/1979 | Giattino | 429/196 |
| 4,259,415 | 3/1981 | Tamura et al. | 429/218 X |
| 4,448,864 | 5/1984 | Broussely | 429/194 |
| 4,450,213 | 5/1984 | Dey et al. | 429/194 X |

Primary Examiner—Charles F. Le Fevour
Attorney, Agent, or Firm—Bucknam and Archer

[57] ABSTRACT

An organic electrolyte cell comprising a light metal as the anode active material, and copper powder-added manganese dioxide as the cathode active material.

3 Claims, 3 Drawing Figures

ORGANIC ELECTROLYTE CELLS

The present invention relates to an organic electrolyte cell and more particularly to an organic electrolyte cell which is improved in storage stability without impairement of cell characteristics such as discharge characteristics by using therein an anode active material composed of a light metal, such as lithium, and a cathode active material composed of manganese dioxide mixed with copper powder.

It has been already proposed to use manganese dioxide as a cathode active material, but this raises the problem that the water contained in manganese dioxide adversely affects a lithium anode active material to cause deterioration of the cell performance of cells using such an anode active material.

In the prior art, in order to remove the water contained in manganese dioxide, it has been proposed to heat-treat the manganese dioxide at a temperature of 350°–400° C., but the treatment so proposed cannot remove the water contained in the manganese dioxide thoroughly and generally allows 0.1 to 0.5 weight percent of the water to remain in the dioxide.

The remaining water of the thus heat treated dioxide will leak into the electrolyte of a cell during the storage when the dioxide is used in the cell and react with the lithium anode of the cell so as to cause self-discharge. In addition, the resulting reaction products cover the lithium anode surfaces so as to cause an increase in the inner resistance and swelling of the cell with the result that the cell performance decreases during storage of the cell.

Thus, it is the present status that a technical solution of improving the storing stability of organic electrolyte cells satisfactorily has not yet been attained.

The present invention has been made to solve the above-mentioned problems.

It is an object of the present invention to provide an organic electrolyte cell having remarkably increased storage stability without impairing the cell performance such as discharge characteristics.

The present inventors made studies in the attempt to attain the above-mentioned object and, as a result of their studies, they found that the object may be attained by using, as the cathode active material, manganese dioxide mixed with copper powder.

Therefore, the present invention consists of an organic electrolyte cell using an anode active material composed of a light metal, such as lithium, and a cathode active material composed of manganese dioxide containing copper powder.

Unlike zinc, aluminium, iron and the like, copper has a ionization potential higher than hydrogen and, therefore, it does not cause its ionization even in a solution containing a proton ($H^+$). Copper having such a higher ionization potential may be present in a stable form without causing its ionization and inhibits the generation of $H^+$ and $OH^-$ even in a non-aqueous electrolyte (organic electrolyte), whereby the copper is kept stable in the cathode active material.

In contrast, even if a metal, such as aluminum or iron, having a lower ionization potential than hydrogen is used in the cathode active material of a cell, it does not inhibit gas evolution during storage of the cell nor does it improve the storage stability.

On one hand, the copper powder so mixed in the present invention will increase the gas evolution inhibiting effect as it increases in amount mixed and, on the other hand, the increase in amount of the copper powder used will correspondingly result in the reduction of the amount of manganese dioxide used; thus, the amount of copper powder added is preferably in the range of about 1–20% by weight of the total of the ingredients for the cathode.

The invention will now be described in detail by the following Examples and Comparative example with reference to the accompanying drawings wherein.

EXAMPLES 1–5 AND COMPARATIVE EXAMPLE 1

Forty (40) mg of lithium as the anode and 4 ml of an electrolyte (containing propylene carbonate and dimethoxyethane in a ratio by volume of 1:1, and also 1 mol/l of $LiCl_4$) were introduced into a cell blank, after which each of cathodes having respective compositions as indicated in the following Table 1 was further inserted into the cell blank in such a manner as to be separated from the anode by means of a separator thereby to prepare a test cell. The cathode used was prepared by pressure molding at 3 t/cm² 0.45 g of ingredients for the cathode which are as indicated in Table 1. The electrolyte and the ingredients for the cathode were respectively dried in a usual manner prior to their use.

As soon as the test cells (Examples 1–5 and Comparative example 1) had been produced, they started to be measured for the amount of gases evolved at the cathode active material. This measurement was continued over a period of time during which each of the test cells was stored at 45° C. The results are as shown in FIG. 1.

TABLE 1

| Ingredients for cathode of Examples and Comparative example | (wt. %) | | | |
| --- | --- | --- | --- | --- |
| | Manganese dioxide | Copper powder | Graphite | Tetrafluoroethylene |
| Example 1 | 89 | 1 | 6 | 4 |
| Example 2 | 87 | 3 | 6 | 4 |
| Example 3 | 85 | 5 | 6 | 4 |
| Example 4 | 80 | 10 | 6 | 4 |
| Example 5 | 70 | 20 | 6 | 4 |
| Comparative example 1 | 90 | 0 | 6 | 4 |

Figure 1:
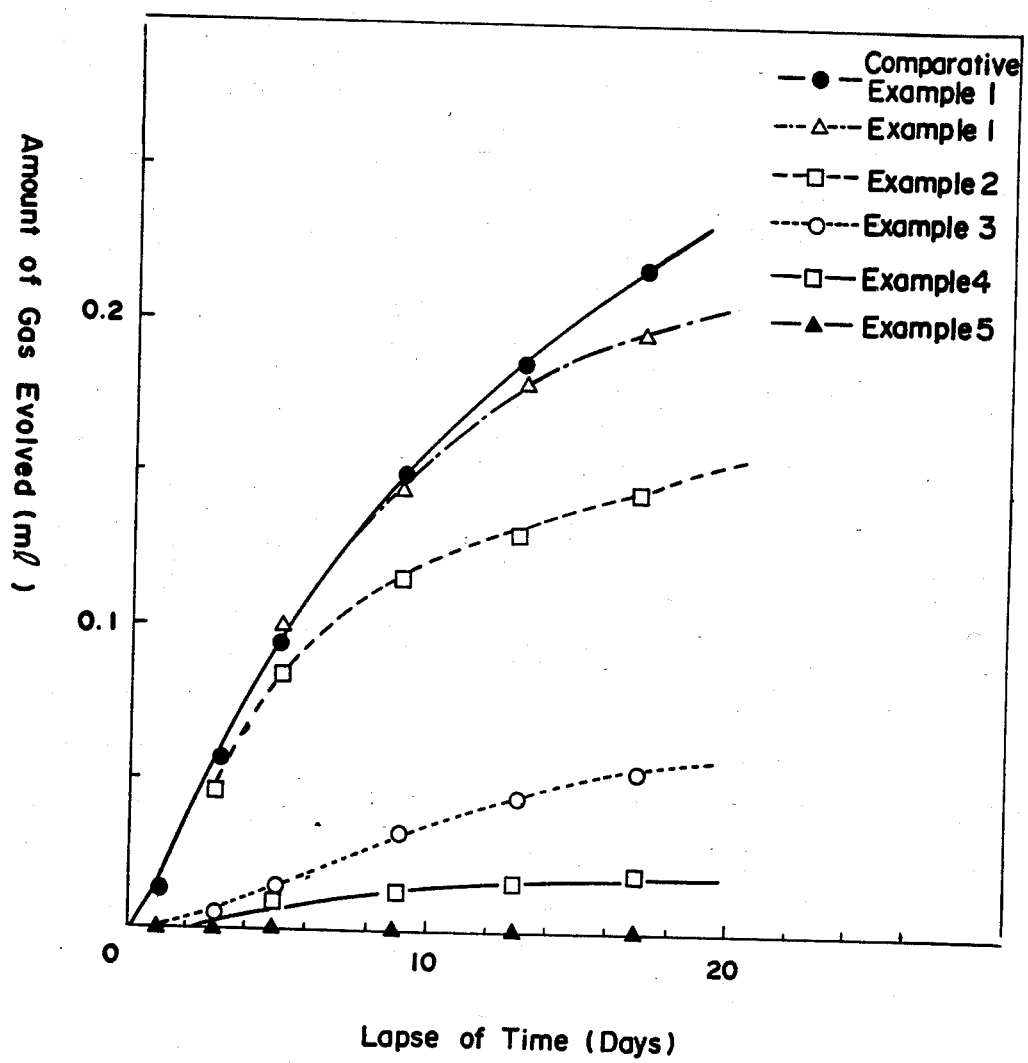
FIG. 1 is a graph showing the relationship between the amount of gas evolved with the lapse of time and the variation of amount of copper mixed.

As is seen from FIG. 1, the test cells of Examples 1–5 wherein manganese dioxide mixed with copper powder was used as the cathode active material exhibited a decreased amount of gases evolved as compared with the test cell of Comparative example 1 wherein the copper powder-free manganese dioxide was used as the cathode active material, and this tendency was more remarkable as the amount of copper powder added was increased. It is seen from the above that the addition of copper powder to manganese dioxide is conducive to the enhancement of storage stability of the cells.

EXAMPLE 6 AND COMPARATIVE EXAMPLE 2

A cathode was prepared by pressure molding under a pressure of 3 t/cm$^2$ 0.15 g of ingredients for the cathode, the ingredients having the same composition as those used in Example 3. The thus prepared cathode and 0.2 ml of an electrolyte having the same composition as that used in Example 1, were introduced into a cell blank having a 10.6-mm inner diameter, after which an excessive amount (22 mg) of lithium as the anode was inserted into the cell blank in such a manner as to be separated from the cathode by the use of a separator, thereby to obtain a test cell (Example 6).

For comparison, the procedure of Example 6 was followed except that the same cathode ingredients as those in Comparative example 1 were used, thereby to obtain a comparative test cell (Comparative example 2).

Figure 2:
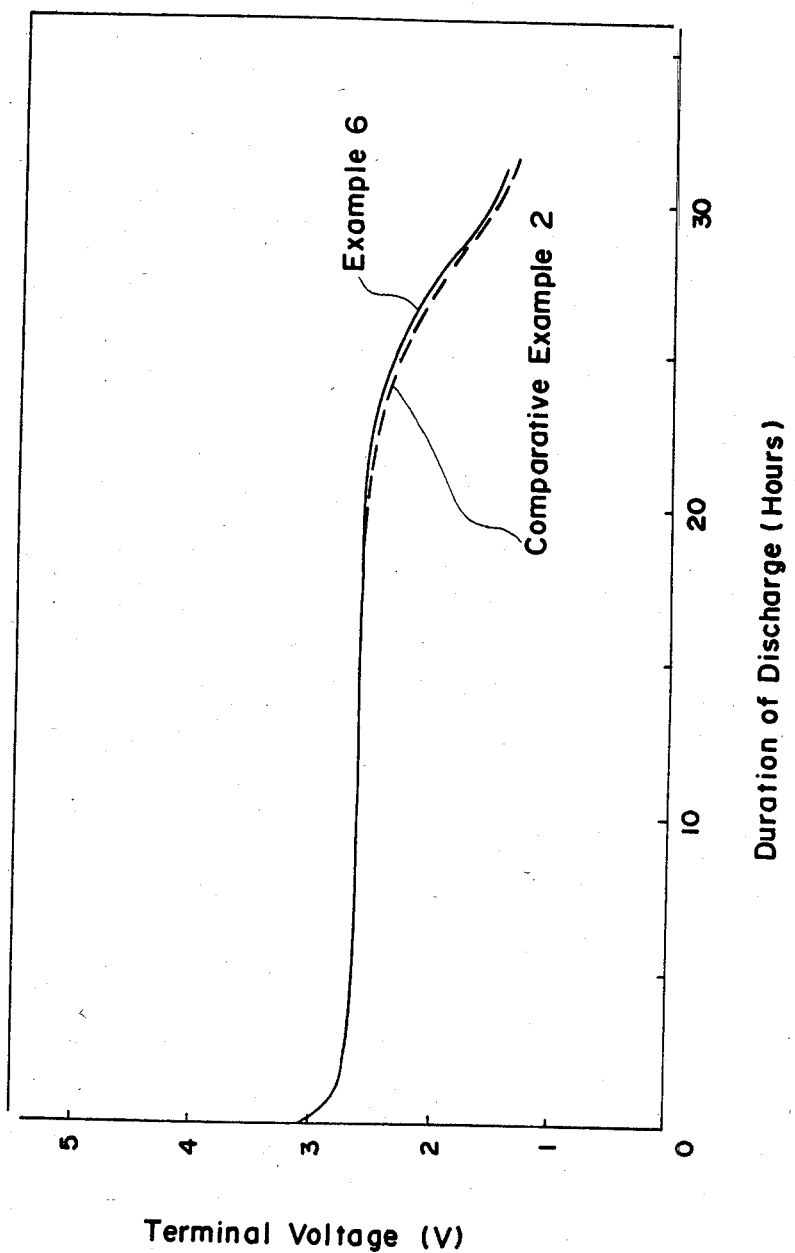
FIG. 2 is a graph showing the continuous discharge characteristics of a cell with the lapse of time beginning at the production of the cell.

The discharge characteristics of these test cells are as shown in FIG. 2. They were found by allowing the test cells to continuously discharge at 20° C. under a load of 2.5 kΩ connected to the cells and measuring the terminal voltage thereof with the lapse of time.

It is apparent from FIG. 2 that the test cell of Example 6 wherein manganese dioxide incorporated with copper powder was used as the cathode active material, was approximately the same in discharge characteristics as the test cell of Comparative example 2 wherein the copper powder-free cathode active material was used, this indicating that the addition of copper powder had no adverse effects on the cell characteristics.

EXAMPLE 7 AND COMPARATIVE EXAMPLE 3

The test cells respectively obtained in Example 6 and Comparative example 2 were hermetically sealed and then stored at 45° C. for one month. The thus stored test cells were hereinafter referred to respectively as test cells of Example 7 and Comparative example 3.

Upon the end of the one-month storage, the test cells so stored were allowed to continuously discharge at 20° C. under a load of 2.5 kΩ, during which they were measured for terminal voltage with the lapse of time. The results are as shown in FIG. 3.

Figure 3:
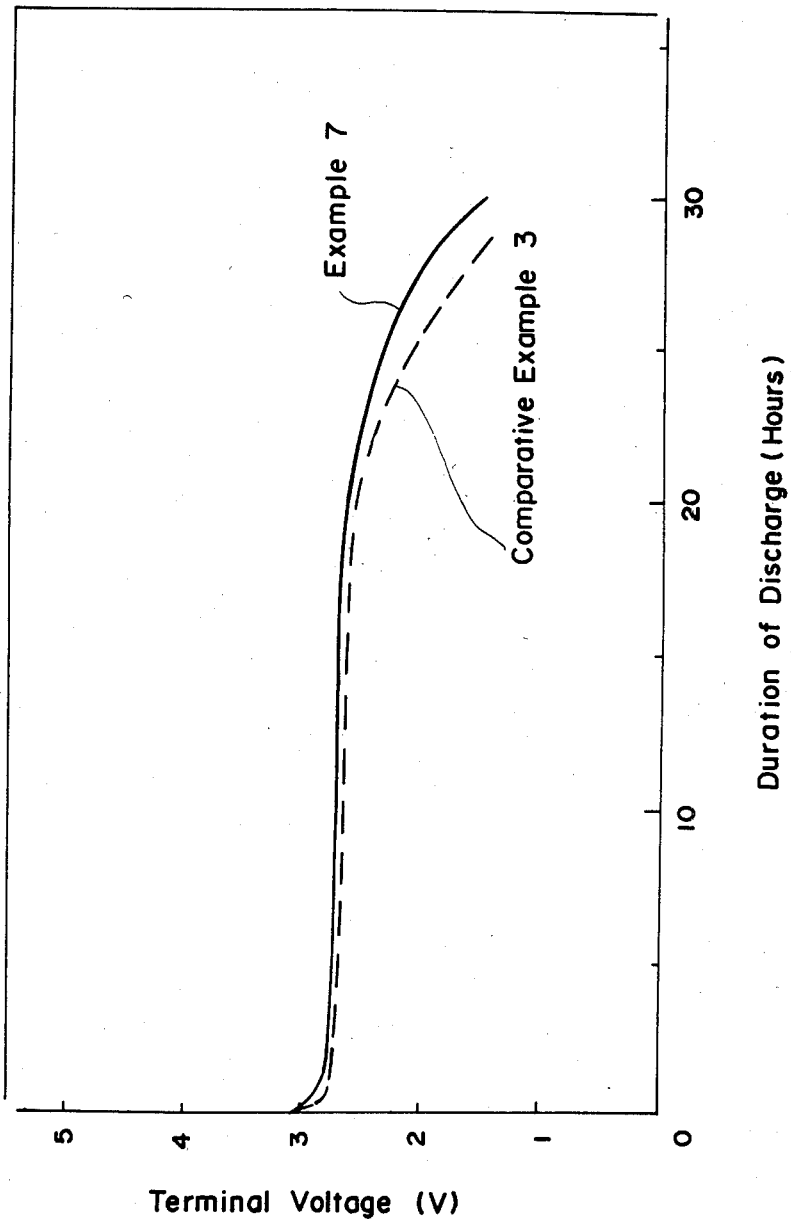
FIG. 3 is a graph showing the continuous discharge characteristics of a cell with the lapse of time beginning at the end of storage thereof for a certain time.

It is seen from FIG. 3 that the test cell of Comparative example 3 wherein copper powder was not used decreased in discharge characteristics (terminal voltage) with the lapse of time, whereas the test cell of Example 7 wherein the manganese dioxide incorporated with copper powder was used decreased sparingly in discharge characteristics as compared with the former. This indicates that the latter (Example 7) is superior in storage stability to the former (Comparative example 3).

As is seen from the foregoing, the organic electrolyte cells of the present invention wherein manganese dioxide incorporated with copper powder is used as the cathode active material, have improved storage stability without decreasing the cell performances such as discharge characteristics.

What is claimed is:

1. An organic electrolyte cell comprising lithium as the anode active material, and copper powder-added manganese dioxide as the cathode active material.

2. An organic electrolyte cell according to claim 1 wherein the copper powder is added to the manganese dioxide in an amount of 1–20% by weight of a total of the ingredients for the cathode.

3. The cell according to claim 1 wherein the organic electrolyte consists of propylene carbonate and dimethoxyethane in the ratio of 1:1, by volume and 1 mole per liter of LiCl$_4$.

* * * * *